UNITED STATES PATENT OFFICE.

ANTON MESSERSCHMITT, OF STOLBERG, GERMANY.

METHOD OF EXTRACTING ALKALIS FROM NATURAL ROCKS.

1,089,716. Specification of Letters Patent. Patented Mar. 10, 1914.

No Drawing. Application filed June 27, 1912. Serial No. 706,244.

*To all whom it may concern:*

Be it known that I, ANTON MESSERSCHMITT, a subject of the German Emperor, residing in the city of Stolberg, Rhine Province, Germany, have invented new and useful Improvements in Methods of Extracting Alkalis from Natural Rocks, of which the following is a specification.

This invention relates to a method of extracting alkalis from natural rocks.

An object of the invention is to provide a method by which the entire contents of alkalis may be extracted from natural rocks.

Another object of the invention is to provide a method which may be exploited on a commercial scale for extracting alkalis from natural rocks and for freeing the alkalis in the residue resulting from heating the rocks with calcium compounds.

Another object of the invention is to modify the structure of the residue which remains after the rocks and calcium compounds have been heated, so that the extraction of the alkalis in the residue may be facilitated.

It has been known that it is possible to separate alkalis from silicates containing alkalis, for instance, from feldspar, by heating the feldspar with lime, limestone, or other calcium compounds, or mixtures thereof, and lixiviating with water. The alkalis are chiefly obtained in the form of hydroxids. If, however, this method is to be performed on a commercial scale, many difficulties are encountered. The separation of the alkalis, according to the method described, is not complete. Generally not more than 60% of the alkalis present can be obtained, and this defect renders the industrial exploitation uneconomical and therefore unsuccessful. Another disadvantage is this, that alkalis remaining in the residue prevent the utilization of this residue on account of their solubility in water. The leaching operation of the product resulting from the heating operation is extremely difficult, as a relatively small quantity of alkalis must be separated from a relatively large quantity of residue. This separation is rendered more difficult by the fact that the end product of the heating operation shows a tendency to conglomerate because of the action of the decomposed silicates on the aluminates, and by the fact that the insoluble compounds, taking up a large amount of hydrate water, stick together and harden, so as to render lixiviation of the alkalis impossible.

It is an object of the present method to avoid these disadvantages and to perfect the extraction of alkalis without leaving even a nominal quantity thereof in the residue.

According to the method of this invention, a relatively small amount of water is poured over the product resulting from the heating operation, and this water is taken up immediately by the hard but porous material. After some time the temperature of the material gradually increases. Apparently a hydrating reaction takes place which has the effect that the clinkers forming said end-product expand considerably and disintegrate into a fine powder. The product obtained in this way, and which may be passed through a disintegrator in order to mix it thoroughly, can now be handled very readily; it may, for instance, be stored in silos, or it may be compressed into cylinders for further treatment. This powder may be lixiviated without any difficulties, because it has lost its tendency to expand or to change to a colloidal structure or to stick together; in spite of its fineness it is in granulated form and is permeable. On account of the fineness of the material, the surface thereof is considerably increased and the insoluble parts are uniformly distributed therethrough. The alkalis can now be lixiviated more completely, so that a much larger amount of alkalis may be extracted. Another advantage resulting from this pulverized condition is that no dust is generated if a sufficient amount of water is added; this is important on account of the very obnoxious effect of the dry dust of the clinker. The pulverization makes any grinding process unnecessary.

I have found that the separation of the alkalis may be made much more effective and that nearly all of the alkalis present may be extracted by treating the powder with steam under pressure; this powder contains water, as stated above, and it may even be saturated to a still higher degree with water for the steam treatment. By this treatment the formation of zeolite, which is connected with the separation of alkalis, is accelerated and completed. By way of example, it may be stated that a treatment lasting about four hours at a pressure of about 45 to 90 pounds, furnishes valuable results. The outside appearance of the material is not changed thereby. Both steps may be combined by introducing the end-product of the heating operation into an autoclave after it has been moistened with the required quantity of water. The total heat of the hydration is utilized thereby, as the material gets heated in short time. It is then only necessary to introduce a small quantity of fresh steam in order to keep the temperature and pressure in the autoclave as high as desired and to replace the heat losses.

Instead of using water for hydrating purposes, other aqueous liquids such as the lye from the leaching operation performed on the residue may be used. Most of the water being bound chemically, as water of hydration, the resulting powder will contain a larger amount of alkalis and in the leaching operation the lye will become more concentrated. The advantage resulting from this step rests in this, that on account of the stronger concentration it will not be necessary to evaporate as much water in order to obtain the solid alkalis as if the lye would have been weaker.

The present process does not only result in a complete extraction of valuable alkalis on a commercial scale, but it has the further advantage that the residues remain in a form in which they may be utilized more readily than heretofore.

By the expression calcium compounds, as used in my specification and claims, I mean those compounds of calcium which are capable of forming calcium silicates and alkaline aluminates with alkaline-bearing rocks.

The residues resulting from the present process do not contain any admixtures of alkali metal compounds and they are therefore eminently adapted for the manufacture of cement. In order to treat the residues for making cement, the same are heated until they slag. If necessary, the composition of the residues is improved by adding suitable substances and the mixture obtained in this way is again ground and mixed.

I claim:—

1. The herein described process of extracting alkalis from rocks, which comprises heating the rocks with calcium compounds capable of reacting therewith to form insoluble calcium silicates and soluble alkali metal compounds and disintegrating the product of the heating operation by adding a relatively small amount of aqueous liquid thereto, and lixiviating.

2. The herein described process of extracting alkalis from rocks, which comprises heating the rocks with calcium compounds capable of reacting therewith to form insoluble calcium silicates and soluble alkali metal compounds, disintegrating the product of the heating operation by treatment with a relatively small amount of aqueous liquid, treating the disintegrated product with steam under pressure, and lixiviating.

3. The herein described process of extracting alkalis from rocks, which comprises heating the rocks with calcium compounds capable of reacting therewith to form insoluble calcium silicates and soluble alkali metal compounds, disintegrating the product of the heating operation by treatment with a relatively small amount of aqueous liquid, introducing the disintegrated product into an autoclave, treating with steam, and lixiviating.

4. The herein described process of extracting alkalis from rocks, which comprises heating the rocks with calcium compounds capable of reacting therewith to form insoluble calcium silicates and soluble alkali metal compounds, disintegrating the product of the heating operation by treatment with a relatively small amount of aqueous liquid, introducing the disintegrated compounds into an autoclave, moistening the same with water in the autoclave, treating with steam, and lixiviating.

In testimony whereof I affix my signature in presence of two witnesses.

ANTON MESSERSCHMITT.

Witnesses:
LOUIS VANDORY,
J. THROENBEREND.

Copies of this patent may be obtained for five cents each, by addressing the "Commissioner of Patents, Washington, D. C."